United States Patent
Hu et al.

(10) Patent No.: US 12,069,561 B2
(45) Date of Patent: Aug. 20, 2024

(54) CELL ACCESS CONTROL METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/368,187

(22) Filed: Sep. 14, 2023

(65) Prior Publication Data
US 2024/0007930 A1 Jan. 4, 2024

Related U.S. Application Data

(63) Continuation of application No. PCT/CN2021/095330, filed on May 21, 2021.

(51) Int. Cl.
*H04W 48/02* (2009.01)
(52) U.S. Cl.
CPC .................. *H04W 48/02* (2013.01)
(58) Field of Classification Search
None
See application file for complete search history.

(56) References Cited

U.S. PATENT DOCUMENTS

| | | | |
|---|---|---|---|
| 9,497,687 B2 | 11/2016 | Lee | |
| 2013/0303162 A1 | 11/2013 | Mikio | |
| 2014/0146804 A1* | 5/2014 | Seok | H04W 48/16 370/338 |
| 2015/0215843 A1* | 7/2015 | Lee | H04W 48/02 370/328 |
| 2016/0234644 A1* | 8/2016 | Belghoul | G01S 5/0236 |
| 2022/0159415 A1* | 5/2022 | Khoryaev | H04L 27/261 |
| 2022/0287082 A1* | 9/2022 | You | H04W 56/001 |

(Continued)

FOREIGN PATENT DOCUMENTS

| CN | 103210686 A | 7/2013 |
|---|---|---|
| CN | 104584462 A | 4/2015 |

(Continued)

OTHER PUBLICATIONS

Samsung. "Considerations on access barring and UE capability", 3GPP TSG RAN WG1 #101e-Meeting, R1-2003913, Jun. 5, 2020 (Jun. 5, 2020), entire document, 2 pages.

(Continued)

*Primary Examiner* — Hong S Cho
(74) *Attorney, Agent, or Firm* — BAYES PLLC

(57) ABSTRACT

A method for cell access control includes: a terminal device receives, from a network device, first information for determining whether each of at least two terminal types is allowed to access a cell corresponding to the network device or barred from accessing the cell corresponding to the network device; and the terminal device accesses or does not access the cells corresponding to the network device based on the first information. Another method for cell access control, a terminal device, and a network device are also provided.

18 Claims, 6 Drawing Sheets

(56) References Cited

U.S. PATENT DOCUMENTS

| | | | |
|---|---|---|---|
| 2022/0353855 A1* | 11/2022 | Li | H04W 74/0833 |
| 2023/0180110 A1* | 6/2023 | Kim | H04W 48/02 |
| | | | 370/329 |
| 2023/0247526 A1 | 8/2023 | Liu | |
| 2024/0040484 A1 | 2/2024 | Mu | |

FOREIGN PATENT DOCUMENTS

| | | |
|---|---|---|
| CN | 111918359 A | 11/2020 |
| CN | 112690022 A | 4/2021 |
| EP | 4178268 A1 | 5/2023 |
| EP | 4266758 A1 | 10/2023 |

OTHER PUBLICATIONS

International Search Report in the international application No. PCT/CN2021/095330, mailed on Jan. 27, 2022, 5 pages with English translation.

English translation of the Written Opinion of the International Search Authority in the international application No. PCT/CN2021/095330, mailed on Jan. 27, 2022, 11 pages with English translation.

"3rd Generation Partnership Project; Technical Specification Group Radio Access Network; Solutions for NR to support non-terrestrial networks (NTN) (Release 16)", 3GPP TR 38.821 V1.0.0 (Dec. 2019), cited in 6.3.3, 143 pages.

Samsung: "Access barring and UE capability", 3GPP Draft; R1-2006156, 3RD Generation Partnership Project (3GPP), Mobile Competence Centre; 650, Route Des Lucioles; F-06921 Sophia-Antipolis Cedex; France, vol. Ran WG1, No. e-Meeting; Aug. 17, 2020-Aug. 28, 2020, Aug. 7, 2020 (Aug. 7, 2020), XP052347530, 3 Access barring for RedCap UEs. 2 pages.

Ericsson: "Remaining details on Random access for NTN", 3GPP Draft; R2-1915567, 3RD Generation Partnership Project (3GPP), Mobile Competence Centre; 650, Route Des Lucioles; F-06921 Sophia-Antipolis Cedex; France vol. Ran WG2, No. Reno, Nevada, US; Nov. 18, 2019-Nov. 22, 2019, Nov. 7, 2019 (Nov. 7, 2019), XP051815978, 2.2.1 Access based on random access capabilities. 7 pages.

Samsung: "UAC enhancements for RedCap Ue", 3GPP Draft; R2-2100209, 3RD Generation Partnership Project (3GPP), Mobile Competence Centre; 650, Route Des Lucioles; F-06921 Sophia-Antipolis Cedex; France, vol. Ran WG2, No. Online; Jan. 25, 2021-Feb. 5, 2021, Jan. 14, 2021 (Jan. 14, 2021), XP051972637, table, proposal 2. 2 pages.

Interdigital (Email Discussion Rapporteur): "Summary of [AT111] [107] [NTN] Pre-compensation and other MAC issues", 3GPP Draft; R2-2008188, 3RD Generation Partnership Project (3GPP), Mobile Competence Centre; 650, Route Des Lucioles; F-06921 Sophia-Antipolis Cedex; France, vol. Ran WG2, No. Aug. 17, 2020-Aug. 28, 2020, Sep. 1, 2020 (Sep. 1, 2020), XP052361282, table (p. 14) entry: OPPO. 64 pages.

Supplementary European Search Report in the European application No. 21940246.8, mailed on Mar. 18, 2024. 15 pages.

* cited by examiner

CELL ACCESS CONTROL METHOD AND APPARATUS, DEVICE, AND STORAGE MEDIUM

CROSS-REFERENCE TO RELATED APPLICATION

This application is a continuation of International Application No. PCT/CN2021/095330 filed on May 21, 2021, the disclosure of which is hereby incorporated by reference in its entirety.

BACKGROUND

Non-Terrestrial Network (NTN) technology is introduced into the 5G New Radio (NR) system, and the NTN technology generally provides communication services to terrestrial users by means of satellite communications.

Compared with traditional terrestrial cellular networks, signal transmission delays between terminal devices and satellites in an NTN system increase significantly. In addition, due to a large coverage of a satellite, the signal transmission delays between different terminal devices within the same satellite coverage and the satellite may be quite different because of their different locations. It is therefore necessary to make some technical improvements on cell access control by taking into account characteristics of the NTN system.

SUMMARY

Embodiments of the present disclosure relate to the technical field of communications, and more particularly, to methods for cell access control, a terminal device and a network device.

A first aspect of the embodiments of the present disclosure provides a method for cell access control, which is performed by a terminal device and includes the following operations.

First information is received from a network device, and the first information determines whether each of at least two terminal types is allowed to access a cell corresponding to the network device or barred from accessing the cell corresponding to the network device.

The cell is accessed or not accessed based on the first information.

A second aspect of the embodiments of the present disclosure provides a method for cell access control, which is performed by a network device and includes the following operations.

First information is sent, and the first information determines whether each of at least two terminal types is allowed to access a cell corresponding to the network device or barred from accessing the cell corresponding to the network device.

A third aspect of the embodiments of the present disclosure provides a terminal device, which includes a transceiver and a processor.

The transceiver is configured to receive first information from a network device, and the first information determines whether each of at least two terminal types is allowed to access a cell corresponding to the network device or barred from accessing the cell corresponding to the network device.

The processor is configured to access or not access the cell based on the first information.

A fourth aspect of the embodiments of the present disclosure provides a network device, which includes a transceiver.

The transceiver is configured to send first information, and the first information determines whether each of at least two terminal types is allowed to access a cell corresponding to the network device or barred from accessing the cell corresponding to the network device.

DETAILED DESCRIPTION

Figure 1:
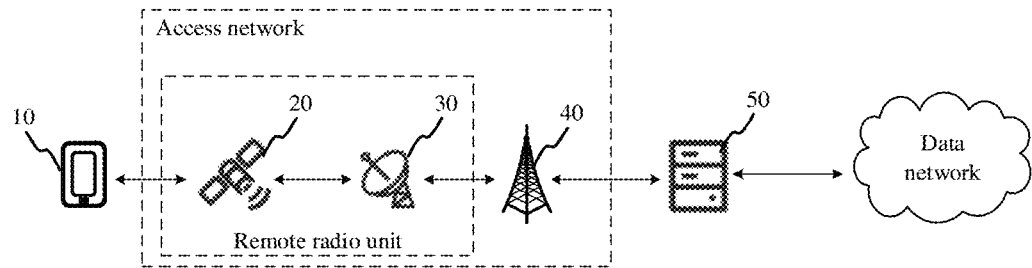
FIG. 1 is a schematic diagram of satellite network architecture for transparent payload according to an embodiment of the present disclosure.

In order to make the objects, technical solutions and advantages of the present disclosure clearer, the embodiments of the present disclosure will be described below in more detail with reference to the accompanying drawings.

The network architectures and service scenarios in the embodiments of the present disclosure are described for purpose of more clearly illustrating the technical solutions of the embodiments of the present disclosure and do not constitute limitations to the technical solutions according to the embodiments of the present disclosure. A person of ordinary skill in the art may know that, with the evolution of the network architecture and the emergence of new service scenarios, the technical solutions according to the embodiments of the present disclosure is also applicable to similar technical problems.

At present, relevant standard organizations are researching the NTN technology, which generally provides communication services to terrestrial users by means of satellite communications. Compared with terrestrial cellular network communications, the satellite communications have many unique advantages. Firstly, the satellite communications are not limited by the user region. For example, general land communications cannot cover areas where the communication device cannot be set up, such as oceans, mountains, deserts or the like, or areas where communication coverage is not provided due to sparse population. However, for the satellite communications, because a satellite can cover a large area of the ground and the satellite can make orbital movements around the earth, theoretically every corner of the earth can be covered by the satellite communications. Secondly, the satellite communications have great social value. The satellite communications can be covered at a lower cost in remote mountainous areas, and poor and backward countries or regions, thus enabling people in these regions to enjoy the advanced voice communications and the mobile Internet technology, which is conducive to reducing the digital divide with the developed areas and promoting the development of these regions. Thirdly, the satellite communications have a long distance, and the communication cost does not increase significantly as the communication distance increases. Finally, the satellite communications have high stability and are not subject to natural disasters.

The communication satellites are classified based on different orbital altitudes as Low-Earth Orbit (LEO) satellites, Medium-Earth Orbit (MEO) satellites, Geostationary Earth Orbit (GEO) satellites, High Elliptical Orbit (HEO) satellites, etc. At the present stage, the main search is on LEO and GEO.

1. LEO

An altitude range of the LEO satellite is 500 km-1500 km, a corresponding orbital period is about 1.5 hours-2 hours. A signal propagation delay of single-hop communication between users is generally less than 20 milliseconds, and a maximum satellite visual time is 20 minutes. A signal propagation distance is short and a link loss is low, which requires low transmission power of the user terminal.

2. GEO

The GEO satellite has an orbital altitude of 35786 km, and a rotation period of 24 hours around the Earth. A signal propagation delay of single-hop communication between users is generally 250 milliseconds.

In order to ensure the coverage of satellites and improve the system capacity of the entire satellite communication system, the satellites use multiple beams to cover the ground, one satellite may form tens or even hundreds of beams to cover the ground; and one satellite beam may cover a ground area with a diameter of tens to hundreds of kilometers.

With reference to FIG. 1, which illustrates a schematic diagram of a satellite network architecture, the communication satellite in the satellite network architecture is a transparent payload satellite. As illustrated in FIG. 1, the satellite network architecture includes a terminal device 10, a satellite 20, an NTN gateway 30, an access network device 40 and a core network device 50.

The terminal device 10 may communicate with the access network device 40 through an air interface, such as a Uu (User Equipment-Universal Mobile Telecommunications System Terrestrial Radio Access Network) interface. In the architecture illustrated in FIG. 1, the access network device 40 may be deployed on the ground, and the uplink and downlink communications between the terminal device 10 and the access network device 40 may be relayed through the satellite 20 and the NTN gateway 30 (generally located on the ground). Taking the uplink transmission as an example, the terminal device 10 sends an uplink signal to the satellite 20, and the satellite 20 forwards the uplink signal to the NTN gateway 30, the NTN gateway 30 forwards the uplink signal to the access network device 40, and then the access network device 40 sends the uplink signal to the core network device 50. Taking the downlink transmission as an example, a downlink signal is sent from the core network device 50 to the access network device 40, the access network device 40 sends the downlink signal to the NTN gateway 30, the NTN gateway 30 forwards the downlink signal to the satellite 20, and then the satellite 20 forwards the downlink signal to the terminal device 10.

Figure 2:
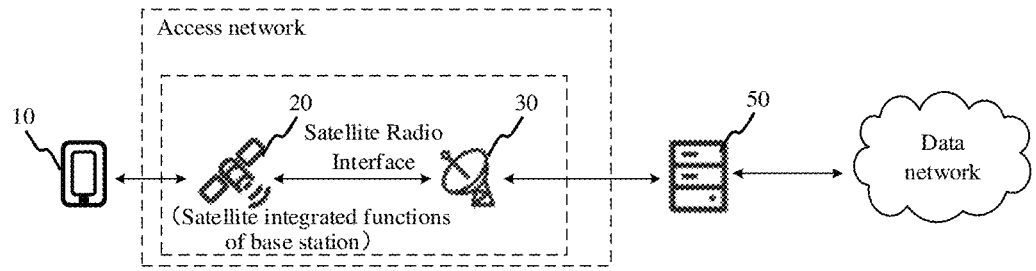
FIG. 2 is a schematic diagram of satellite network architecture for regenerative payload according to an embodiment of the present disclosure.

With reference to FIG. 2, which illustrates a schematic diagram of another satellite network architecture, the communication satellite in the satellite network architecture is a regenerative payload satellite. As illustrated in FIG. 2, the satellite network architecture includes a terminal device 10, a satellite 20, an NTN gateway 30 and a core network device 50.

In the architecture illustrated in FIG. 2, the functions of the access network device 40 are integrated on the satellite 20, that is, the satellite 20 has the function of the access network device 40. The terminal device 10 may communicate with the satellite 20 through the air interface, such as the Uu interface. The satellite 20 may communicate with the NTN gateway 30 (generally located on the ground) through a Satellite Radio Interface (SRI).

In the architecture illustrated in FIG. 2, taking the uplink transmission as an example, the terminal device 10 transmits the uplink signal to the satellite 20, and the satellite forwards the uplink signal to the NTN gateway 30, and then the NTN gateway 30 transmits the uplink signal to the core network device 50. Taking the downlink transmission as an example, the downlink signal from the core network device 50 is sent to the NTN gateway 30, the NTN gateway 30 forwards the downlink signal to the satellite 20, and then the satellite 20 forwards the downlink signal to the terminal device 10.

In the network architectures illustrated in FIG. 1 and FIG. 2, the access network device 40 is a device for providing wireless communication services to the terminal device 10. A connection may be established between the access network device 40 and the terminal device 10, so as to communicate with each other through the connection, including signaling and interaction of data. The number of access network devices 40 may be multiple and two adjacent access network devices 40 may also communicate with each other in a wired or wireless manner. The terminal device 10 may switch between different access network devices 40, that is, establish connections with different access network devices 40.

Taking the cellular communication network as an example, the access network device 40 in the cellular communication network may be a base station. The base station is a device that is deployed in an access network and provides wireless communication functions to the terminal device 10. The base stations may include various forms of macro base stations, micro base stations, relay stations, access points and the like. In systems using different wireless access technologies, the name of the device having base station functions may be different, for example, in the 5G NR system, they are referred to as gNodeB or gNB. The name of the "base station" may change as the evolution of communication technology evolves. For convenience of description, in the embodiments of the present disclosure, the above devices providing wireless communication functions for the terminal device 10 are collectively referred to as the base station or the access network device.

In addition, the terminal device 10 in the embodiments of the present disclosure may include various handheld devices having wireless communication functions, vehicle-mounted devices, wearable devices, computing devices or other processing devices connected to a wireless modem, as well as various forms of User Equipment (UE), Mobile Station (MS), terminal devices and the like. For convenience of description, in the embodiments of the present disclosure, each of the above devices is collectively referred to as a terminal device. In the embodiments of the present disclosure, "UE" is used in some places to represent the "terminal device". In the embodiments of the present disclosure, the "network device" may be the access network device (such as, the base station) or the satellite.

In addition, taking the 5G NTN network as an example, multiple satellites 20 may be included in the NTN network. A satellite 20 may cover a certain area of the ground to provide wireless communication services to the terminal devices 10 on the ground area. In addition, the satellites 20 may orbit around the earth, and may provide communication coverage of different areas of the earth's surface by arranging the multiple satellites 20.

In addition, in the embodiments of the present disclosure, the terms "network" and "system" are commonly used interchangeably, but their meanings will be understood by those skilled in the art. The technical solutions described in the embodiments of the present disclosure may be applied to the Long Term Evolution (LTE) system, the subsequent evolutionary systems of the 5G NR system, or other communication systems, which are not limited by the present disclosure.

Before introducing the technical solutions of the present disclosure, some background technical knowledge involved in the present disclosure is introduced and explained.

Cellbarred Mechanism

The first action of UE in the initial access stage, after obtaining time-frequency domain synchronization, is to read Master Information Block (MIB). The MIB includes the following two parameters related to cell selection and reselection:

1. cellBarred: the cellBarred is used to indicate whether the current cell is barred from accessing for all UEs. If the cellBarred indicates barred (i.e., the access is barred), the UE in Radio Resource Control (RRC) idle state and RRC inactive state cannot be able to reside in the cell.
2. intraFreqResection: the IntraFreqResection is used to indicate whether the UE is allowed selection or reselection of the second best cell on the current frequency if the current cell is the best cell on the current frequency and the UE is not allowed to reside.

UAC Mechanism

Unified Access Control (UAC) mechanism is introduced into the NR for load control at the network side. Firstly, an access identity and an access category are defined.

The access identity represents the identity characteristics of the UE itself. At present, the standardized access identities in NR are 0-15, where 3-10 are undefined parts.

The access category represents services attributes of calls initiated by UE, where 0-7 are standardized access categories, 32-63 are access categories defined by operators, and others are undefined access categories.

Radio Access Network (RAN) broadcasts access control information related to the access category and the access identity, and UE Access Stratum (AS) performs an Access Class Barrring (ACB) check based on the broadcast access control information and the access category and the access identity provided by AS/Non Access Stratum (NAS).

UAC parameters are configured for each access category and for each Public Land Mobile Network (PLMN).

Up to 8 UAC-BarringInfoSets are configured at the network side, and each UAC-BarringInfoSet includes the following parameters:
 (a) uac-BarringFactor: the uac-BarringFactor indicates the probability that access attempts are allowed to pass.
 (b) uac-BarringTime: the uac-BarringTime is used to determine the minimum time interval between a failure of an access attempt initiated by a certain access category and the next access attempt reinitiated by the same access category.
 (c) uac-BarringForAccessIdentity: the uac-BarringForAccessIdentity is used to separately determine whether each access identity allows access attempts or not.

Each access category is associated with a UAC-BarringInfoSet and there are 64 access categories in total (where the access category 0 does not need to be configured). Each PLMN is associated with a UAC-BarringPerCatList for each PLMN configuration. If it is not configured for each piece of PLMN information, the above configuration is applicable to all PLMNs.

For access category 1, uac-AccessCategory1-Selection-AssistanceInfo is configured to assist in determining whether the ACB check is used for the access category 1.

Based on the UAC configuration parameters, the operations that the UE performs the UAC checking are as follows.
 S1: provided that neither timer T390 nor T302 is running and the access category is not 0, then operation S2 is performed based on the UAC configuration information judgment.
 S2: if the corresponding bit of the access identity in the uac-BarringForAccessIdentity is set to 0, this indicates that access is allowed; if the corresponding bit is set to 1, further judgment is required and operation S3 is performed.
 S3: a random number in the range of 0≤rand<1 is generated. If the random number (i.e., rand) is less than uac-BarringFactor, this indicates that access is allowed, otherwise it indicates that access is barred. If access is barred, a random number in the range of 0≤rand<1 is generated, T390 is started and T390=(0.7+0.6*rand)*uac-BarringTime.

For events triggered by the NAS, the NAS determines the access identity, the access category and the cause value. The NAS provides the access identity and the access category to the AS, the AS is responsible for the ACB check. If the ACB check passes/succeeds, the AS notifies the NAS, and the NAS provides the cause value to the AS. Based on the ACB check feedback of the AS, the NAS is responsible for stopping or allowing service transmission.

For events triggered by the AS, which include paging triggering and RAN-based Notification Area Update (RNAU) triggering (the interaction of information between the NAS and the AS belongs to a UE implementation behavior).

For Paging, the access category is 0 and is not controlled by the ABC. The cause value will be overridden, the interaction is performed between the NAS and the AS, and the NAS provides the information of the cause value.

For RNAU, the access category is 8, the AS determines that the access identity needs to be provided by the NAS to the AS, and how and when the interaction belongs to a UE implementation behavior. The cause value is determined by the AS to be ma-Update.

Figure 3:
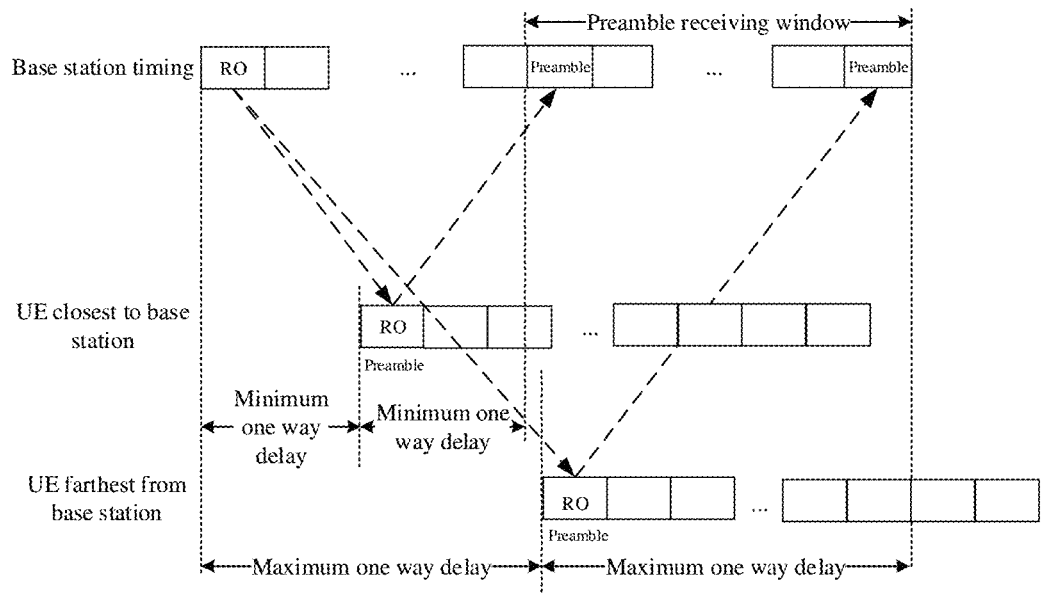
FIG. 3 exemplarily illustrates a schematic diagram of a preamble receiving window in an NTN system.

Compared with the cellular network used by the traditional NR, the signal propagation delays between UEs and satellites in the NTN increase significantly. In addition, due to the large coverage of the satellite, the signal transmission delays between different UEs within the same satellite coverage and the satellite may be quite different because of their different locations. According to the discussion of NTN application scenarios in the current standardization process, the maximum difference of signal transmission delay between a base station and different UEs in an NTN cell is 10.3 ms. Such a large difference in signal transmission delay will cause different UEs to use the same Random Access Channel (RACH) resources to send the preambles, and the preambles will arrive at the base station at different times. As illustrated in FIG. 3, in order to ensure that the base station can receive the preambles from different UEs in the cell, the length of the preamble receiving window at the base station side should be extended to 2*(maximum one way delay– minimum one way delay).

Figure 4:
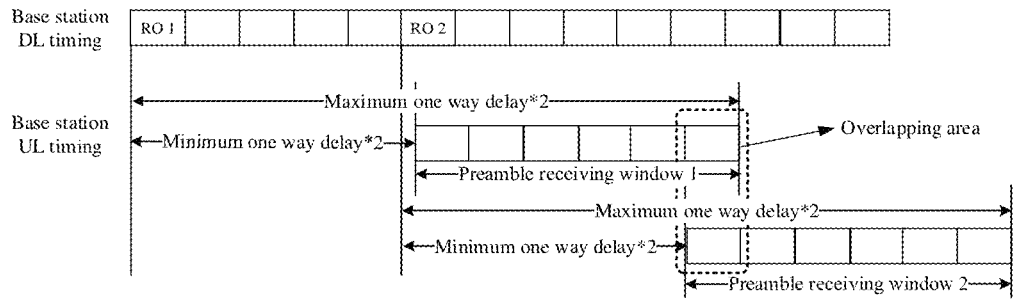
FIG. 4 exemplarily illustrates a schematic diagram of the overlapping of preamble receiving windows in an NTN system.

After receiving the preambles, the base station needs to know at which RACH Occasion (RO) the UE sent the preamble to determine the initial Timing Advance (TA) of the UE. As illustrated in FIG. 4, in the NTN, since a longer preamble receiving window needs to be introduced, if the time interval between adjacent ROs in the time domain is less than the length of the preamble receiving window, the problem that the preamble receiving windows corresponding to ROs at different times overlap in the time domain will occur, so that the base station receives the preambles in the overlapping area of the multiple preamble receiving windows, thus, it is impossible to know which RO the UE sends the preambles and it is impossible to determine the TA of the UE.

To solve the problem of ambiguity of the preamble receiving window that may occur on the network side in the NTN, one idea is to ensure that the time interval between adjacent ROs in the time domain is not less than the length of the RACH receiving window when configuring RACH resources in the network. The disadvantage of this method is that the RACH capacity will be reduced.

In addition, for the terminal device with TA pre-compensation capability, according to its random access process, the UE itself may estimate the TA and send the preamble using the estimated TA. Since the UE has adjusted its uplink timing before sending the preamble, for the UE with TA pre-compensation capability, the network does not actually need to use the extended RACH receiving window to receive the preambles. Therefore, for the terminal device with TA pre-compensation capability, since there is no need to use an extended RACH receiving window for preamble reception, there is no restriction on the time interval between adjacent ROs, thereby improving the RACH capacity to a certain extent.

It is therefore necessary to make some technical improvements to cell access control by taking into account the characteristics of the NTN system.

Figure 5:
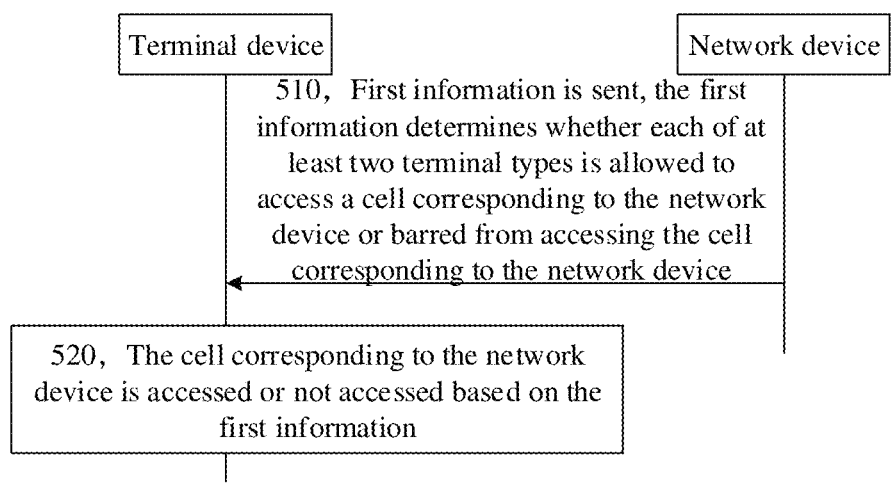
FIG. 5 is a flowchart of a method for cell access control according to an embodiment of the present disclosure.

With reference to FIG. 5, a flowchart of a method for cell access control according to an embodiment of the present disclosure is illustrated. The method may be applied to the network architecture illustrated in FIG. 1 or FIG. 2. The method may include the following operations 510-520.

In the operation 510, a network device sends first information, and the first information determines whether each of at least two terminal types is allowed to access a cell corresponding to the network device or barred from accessing the cell corresponding to the network device.

Accordingly, a terminal device receives the first information from the network device.

In the operation 520, the terminal device accesses or does not access the cell corresponding to the network device based on the first information.

For example, the at least two terminal types include a first terminal type and a second terminal type, the first terminal type and the second terminal type are two different terminal types, and the first information determines whether the cell corresponding to the network device allows or bars access of a terminal device having the first terminal type, and also determines whether the cell corresponding to the network device allows or bars access of a terminal device having the second terminal type.

Optionally, after receiving the first information, the terminal device may determine whether the cell corresponding to the network device allows or bars access of the terminal device based on the first information and the terminal type to which the terminal device belongs. Optionally, if the terminal device determines that the cell corresponding to the network device allows access of the terminal device, the terminal device accesses the cell corresponding to the network device at an appropriate time; if that the terminal device determines that the cell corresponding to the network device bars access of the terminal device, the terminal device does not access the cell corresponding to the network device.

Optionally, the terminal type is determined based on the capabilities of the terminal devices, i.e. the terminal devices may be classified based on the different capabilities of the different terminal devices. Optionally, the terminal type is determined based on at least one of: a TA pre-compensation capability or a positioning capability. Optionally, the TA pre-compensation capability refers to a capability of the terminal device to perform TA pre-compensation by itself using the positioning capability in combination with the ephemeris information of the satellite and/or common TA information broadcast by the system information. For example, when the terminal device has the TA pre-compensation capability, the terminal device can estimate a TA corresponding to a service link between the terminal device and the satellite, obtain a first TA by combining information such as a common TA broadcast by the network, and use the first TA to perform TA compensation for sending the msg1, in which the msg1 is a message for sending the preamble during the random access process. Optionally, the positioning capability refers to a capability of a terminal device to obtain its own position information, such as, Global Navigation Satellite System (GNSS) capability.

In exemplary embodiments, the at least two terminal types include the first terminal type and the second terminal type. The first terminal type has the TA pre-compensation capability, and the second terminal type does not have the TA pre-compensation capability. Or, the first terminal type has the positioning capability, and the second terminal type does not have the positioning capability. Or, the first terminal type has the TA pre-compensation capability and the positioning capability, and the second terminal type does not have the TA pre-compensation capability and/or the positioning capability.

In exemplary embodiments, the first information includes one of: cell access barring indication information, random access resource configuration information, and UAC configuration information. Reference is made to the following embodiments for an introductory description of the above information.

In an exemplary embodiment, the first information is carried in system information. The network device transmits the system information, where the system information includes the first information. Accordingly, the terminal device receives the system information from the network device, where the system information includes the first information. Optionally, the network device broadcasts the system information, where the system information includes the first information.

In one example, the first information is entirely included in one MIB. In some embodiments, considering that the MIB already includes the cell access barring indication information (i.e., cellBarred information mentioned above), the cell access barring indication information in the MIB may be reused for use by a certain terminal type (specifically reused for which terminal type may be agreed by a protocol or newly configured), and the newly added cell access barring indication information in the MIB is applied to other terminal types. Taking the first terminal type and the second terminal type mentioned above as examples, original cell access barring indication information in the MIB may be reused for use by the first terminal type, i.e., it is determined whether the cell corresponding to the network device allows or bars access of the terminal device corresponding to the first terminal type based on the original cell access barring indication information in the MIB, and new cell access barring indication information is added to the MIB (such as, the remaining 1 bit reserved field in the MIB is used for the newly added cell access barring indication information) for use by the second terminal type, i.e., it is determined whether the cell corresponding to the network device allows or bars access of the terminal device corresponding to the second terminal type based on the newly added cell access barring indication information in the MIB. Optionally, the original cell access barring indication information in the MIB may be reused for use by the second terminal type, i.e., it is determined whether the cell corresponding to the network device allows or bars access of the terminal device corresponding to the second terminal type based on the cell access barring indication information in the MIB, and new cell access barring indication information is added to the MIB (such as, the remaining 1 bit reserved field in the MIB is used for the newly added cell access barring indication information) for use by the first terminal type, i.e., it is determined whether the cell corresponding to the network device allows or bars access of the terminal device corresponding to the first terminal type based on the newly added cell access barring indication information in the MIB.

In another example, the first information is entirely included in one System Information Block (SIB). Optionally, the SIB may be SIB 1, SIB 2 or other SIBs, which is not limited in the present disclosure. Optionally, unused bits in the SIB are used for indicating cell access barring indication information corresponding to the at least two terminal types (e.g. including the first terminal type and the second terminal type), respectively.

In another example, the first information is dispersed in one MIB and at least one SIB, or the first information is dispersed in multiple SIBs. The SIB may be SIB 1, SIB 2 or other SIBs, which is not limited in the present disclosure. In some embodiments, considering that the MIB already has the cell access barring indication information (i.e., the cellBarred information mentioned above), the cell access barring indication information in the MIB may be reused for use by a certain terminal type (specifically reused to which terminal type may be agreed by a protocol or newly configured), and the newly added cell access barring indication information in the SIB is applied to other terminal types. Taking the first terminal type and the second terminal type mentioned above as examples, the cell access barring indication information in the MIB may be reused for use by the first terminal type, i.e., it is determined whether the cell corresponding to the network device allows or bars access of the terminal device corresponding to the first terminal type based on the cell access barring indication information in the MIB, and new cell access barring indication information is added to the SIB (such as SIB 1, SIB 2 or other SIBs) for use by the second terminal type, i.e., it is determined that the cell corresponding to the network device allows or bars access of the terminal device corresponding to the second terminal type based on the cell access barring indication information in the SIB. Optionally, the cell access barring indication information in the MIB may be reused for use by the second terminal type, that is, it is determined whether the cell corresponding to the network device allows or bars access of the terminal device corresponding to the second terminal type based on the cell access barring indication information in the MIB, and newly cell access barring indication information is added to the SIB (such as SIB 1, SIB 2 or other SIB) for use by the first terminal type, that is, it is determined whether the cell corresponding to the network device allows or bars access of the terminal device corresponding to the first terminal type based on the cell access barring indication information in the SIB.

In the present disclosure, the first information is provided to the terminal device by the network device, the first information determines whether each of at least two types of terminal is allowed to access a cell corresponding to the network device or barred from accessing the cell corresponding to the network device, and the terminal device accesses or does not access the cell corresponding to the network device based on the first information, thereby realizing the cell access control for different types of terminals respectively, controlling the access of various types of terminals more flexibly and better utilizing of network resources.

In an exemplary embodiment, the first information includes cell access barring indication information for indicating whether access is allowed or barred. Optionally, the cell access barring indication information may be the cellBarred information for indicating that residence in the cell corresponding to the network device is allowed or barred.

Optionally, for a target terminal type in the at least two terminal types (the target terminal type may be any one of the at least two terminal types), responsive to that the cell access barring indication information corresponding to the target terminal type is the first indication information, it is indicated that the cell corresponding to the network device allows access of the target terminal type (i.e., the terminal device belonging to the target terminal type), for example, it is indicated that the cell corresponding to the network device allows residence of the target terminal type (i.e., the terminal device belonging to the target terminal type). Optionally, responsive to that the cell access barring indication information corresponding to the target terminal type is the second indication information, it is indicated that the cell corresponding to the network device bars access of the target terminal type (i.e., the terminal device belonging to the target terminal type), for example, it is indicated that the cell corresponding to the network device bars residence of the target terminal type (i.e., the terminal device belonging to the target terminal type). The first indication information and the second indication information are different, for example, the first indication information is 0 and the second indication information is 1, or the first indication information is 1 and the second indication information is 0.

Figure 6:
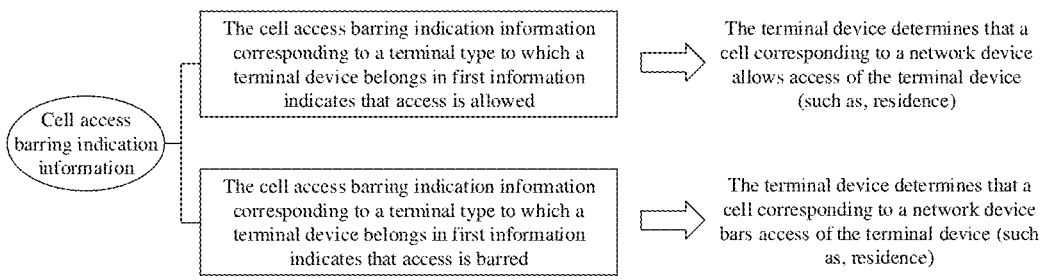
FIG. 6 is a schematic diagram of performing allowing or barring determination based on cell access barring indication information according to an embodiment of the present disclosure.

In one example, if the first information includes the cell access barring indication information, the terminal device determines whether the cell corresponding to the network device allows or bars access of the terminal device based on the cell access barring indication information corresponding to the terminal type to which the terminal device belongs. For example, as illustrated in FIG. 6, if the cell access barring indication information corresponding to a terminal type to which the terminal device belongs in the first information indicates that access is allowed, the terminal device determines that the cell corresponding to the network device allows access of the terminal device (such as, residence). Optionally, if the cell access barring indication information corresponding to a terminal type to which the terminal device belongs in the first information indicates that access is barred, the terminal device determines that the cell corresponding to the network device bars access of the terminal device (such as, residence). As an example, assuming that the cell access barring indication information corresponding to the first terminal type indicates that access is allowed, and the cell access barring indication information corresponding to the second terminal type indicates that access is barred, then the terminal device determines that the cell corresponding to the network device allows access of the terminal device (such as, residence) if the terminal device belongs to the first terminal type, and the terminal device determines that the cell corresponding to the network device bars access of the terminal device (such as, residence) if the terminal device belongs to the second terminal type.

Figure 7:
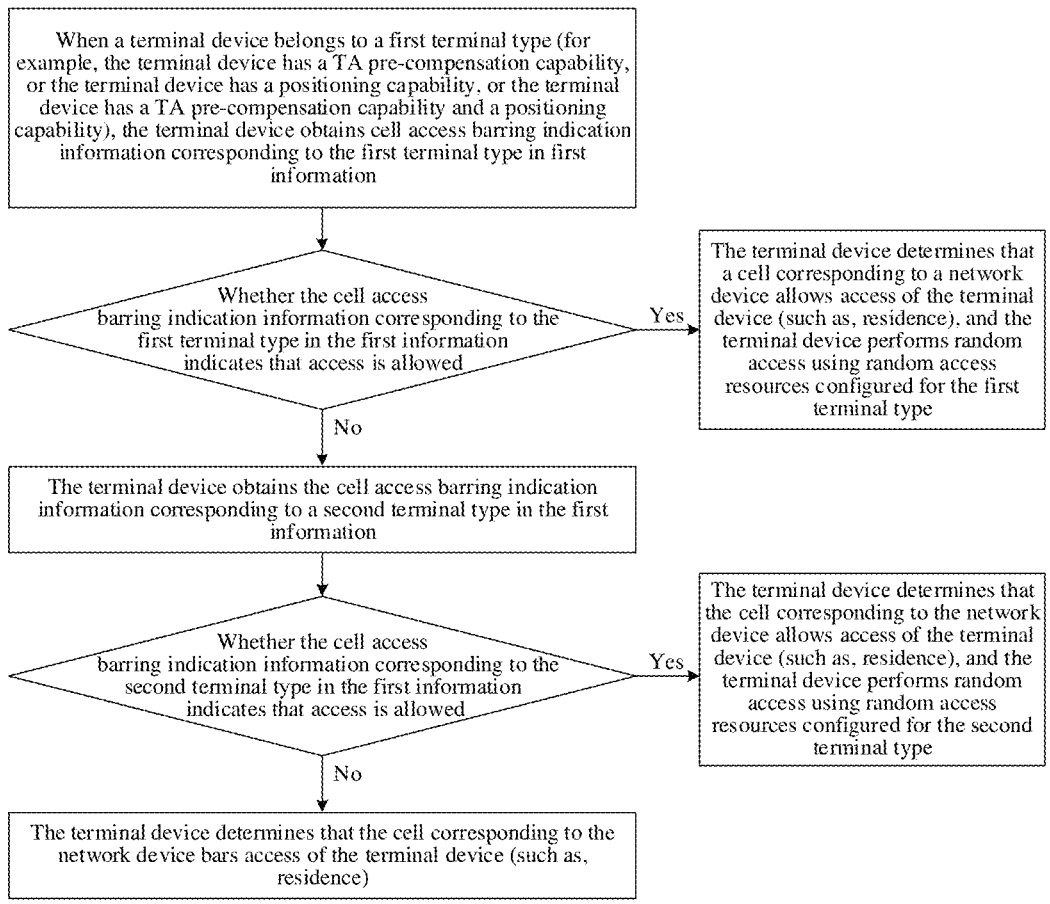
FIG. 7 is a schematic diagram of performing allowing or barring determination based on cell access barring indication information according to another embodiment of the present disclosure.

In another example, as illustrated in FIG. 7, in a case that the terminal device belongs to the first terminal type (for example, the terminal device has the TA pre-compensation capability, or the terminal device has the positioning capability, or the terminal device has the TA pre-compensation capability and the positioning capability), if the cell access barring indication information corresponding to the first terminal type in the first information indicates that access is allowed, then the terminal device determines that the cell corresponding to the network device allows access of the terminal device (such as, residence); or, if the cell access barring indication information corresponding to the first terminal type in the first information indicates that access is barred, and the cell access barring indication information corresponding to the second terminal type in the first information indicates that access is allowed, then the terminal device determines that the cell corresponding to the network device allows access of the terminal device (such as, residence); or, if the cell access barring indication information corresponding to the first terminal type in the first information indicates that access is barred, and the cell access barring indication information corresponding to the second terminal type in the first information indicates that access is barred, then the terminal device determines that the cell corresponding to the network device bars access of the terminal device (such as, residence).

In another example, in a case that the terminal device belongs the first terminal type (for example, the terminal device has the TA pre-compensation capability, or the terminal device has the positioning capability, or the terminal device has the TA pre-compensation capability and the positioning capability), if the cell access barring indication information corresponding to the first terminal type in the first information indicates assess is allowed, and/or the cell access barring indication information corresponding to the second terminal type in the first information indicates assess is allowed, then the terminal device determines that the cell corresponding to the network device allows access of the terminal device (such as, residence); or, if the cell access barring indication information corresponding to the first terminal type in the first information indicates access is barred, and the cell access barring indication information corresponding to the second terminal type in the first information indicates access is barred, then the terminal device determines that the cell corresponding to the network device bars access of the terminal device (such as, residence).

Optionally, in a case that the terminal device belongs to the first terminal type, if the cell corresponding to the network device allows access of the first terminal type, then the terminal device performs random access using random access resources configured for the first terminal type. Optionally, if the cell corresponding to the network device bars access of the first terminal type and allows access of the second terminal type, then the terminal device performs random access using random access resources configured for the second terminal type.

In another example, in a case that the terminal device belongs to the second terminal type (for example, the terminal device does not have the TA pre-compensation capability, or the terminal device does not have the positioning capability, or the terminal device does not have the TA pre-compensation capability and/or the positioning capability), if the cell access barring indication information corresponding to the second terminal type in the first information indicates that access is allowed, then the terminal device determines that the cell corresponding to the network device allows access of the terminal device (such as, residence); or, if the cell access barring indication information corresponding to the second terminal type in the first information indicates that access is barred, then the terminal device determines that the cell corresponding to the network device bars access of the terminal device (such as, residence).

Optionally, in a case that the terminal device belongs to the second terminal type, if the cell corresponding to the network device allows access of the second terminal type, then the terminal device performs random access using random access resources configured for the second terminal type.

In an exemplary embodiment, in response to determining that the cell corresponding to the network device bars access of the terminal device, the terminal device determines whether to allow selection or reselection of an intra-frequency cell corresponding to the network device for access based on the intra-frequency reselection indication information corresponding to a terminal type to which the terminal device belongs. The intra-frequency cells refer to cells with the same frequency. In one example, the intra-frequency reselection indication information may be intraFreqReselection indicating whether the terminal device is allowed to select or reselect to the next best cell on the current frequency if the current cell is the best cell on the current frequency and the terminal device is not allowed to reside therein.

Optionally, the first information also includes the intra-frequency reselection indication information respectively corresponding to the at least two terminal types. For example, when the first terminal type and the second terminal type are included, the first information includes, in addition to the cell access barring instruction information corresponding to the first terminal type and the cell access barring instruction information corresponding to the second terminal type, the intra-frequency reselection instruction information corresponding to the first terminal type and the intra-frequency reselection instruction information corresponding to the second terminal type.

In the present disclosure, the corresponding cell access barring indication information for different terminal types are respectively configured, and the cell access barring indication information indicates whether the access is allowed or barred, thus realizing the cell access control for different terminal types respectively.

In addition, in some embodiments, when the terminal device belongs to the first terminal type (for example, the terminal device has the TA pre-compensation capability, or the terminal device has the positioning capability, or the terminal device has the TA pre-compensation capability and the positioning capability), the terminal device preferentially determines whether the cell corresponding to the network device allows access of the terminal devices based on the cell access barring indication information corresponding to the first terminal type. Further, in response to determining that the cell corresponding to the network device bars access of the first terminal type, the terminal device further determines whether the cell corresponding to the network device allows access of the terminal device based on the cell access barring indication information corresponding to the second terminal type. With the two-step judgment, the terminal device is guaranteed to access the network using the TA pre-compensation capability to ensure RACH capacity, and access may be performed without using the TA pre-compensation capability when the network is congested, which increases the chance of access success, thus improving the access success rate.

In an exemplary embodiment, the first information includes random access resource configuration information for indicating whether access is allowed or bared.

Optionally, for the target terminal type in the at least two terminal types (the target terminal type may be any one of the at least two terminal types), responsive to that the first information includes the random access resource configuration information corresponding to the target terminal type, it is indicated that the cell corresponding to the network device allows access of the target terminal type; or, responsive to that the first information excludes the random access resource configuration information corresponding to the target terminal type, it is indicated that the cell corresponding to the network device bars access of the target terminal type.

Figure 8:
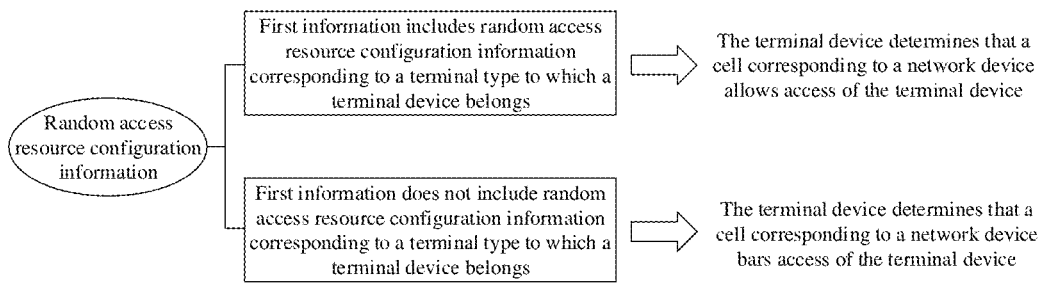
FIG. 8 is a schematic diagram of performing allowing or barring determination based on random access resource configuration information according to an embodiment of the present disclosure.

In one example, when the first information includes the random access resource configuration information, the terminal device determines whether the cell corresponding to the network device allows or bars access of the terminal device based on whether the first information includes random access resource configuration information corresponding to a terminal type to which the terminal device belongs. For example, as illustrated in FIG. 8, if the first information includes random access resource configuration information corresponding to a terminal type to which the terminal device belongs, the terminal device determines that the cell corresponding to the network device allows access of the terminal device; or, if the first information excludes random access resource configuration information corresponding to a terminal type to which the terminal device belongs, the terminal device determines that the cell corresponding to the network device bars access of the terminal device. As an example, assuming that the first information includes the random access resource configuration information corresponding to the first terminal type and the first information excludes the random access resource configuration information corresponding to the second terminal type, then the terminal device determines that the cell corresponding to the network device allows access of the terminal device if the terminal device belongs to the first terminal type, and the terminal device determines that the cell corresponding to the network device bars access of the terminal device if the terminal device belongs to the second terminal type.

Figure 9:
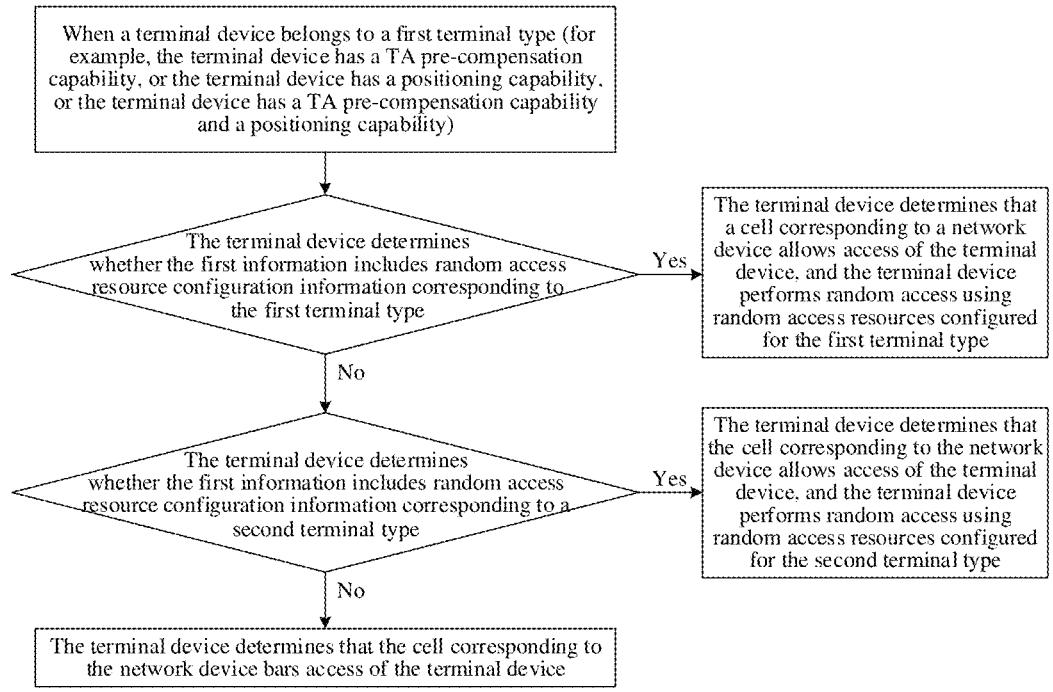
FIG. 9 is a schematic diagram of performing allowing or barring determination based on random access resource configuration information according to another embodiment of the present disclosure.

In another example, as illustrated in FIG. 9, in a case that the terminal device belongs to the first terminal type (for example, the terminal device has the TA pre-compensation capability, or the terminal device has the positioning capability, or the terminal device has the TA pre-compensation capability and the positioning capability), if the first information includes the random access resource configuration information corresponding to the first terminal type, then the terminal device determines that the cell corresponding to the network device allows access of the terminal device; or, if the first information excludes the random access resource configuration information corresponding to the first terminal type, and the first information includes the random access resource configuration information corresponding to the second terminal type, then the terminal device determines that the cell corresponding to the network device allows access of the terminal device; or, if the first information excludes the random access resource configuration information corresponding to the first terminal type, and the first information excludes the random access resource configuration information corresponding to the second terminal type, then the terminal device determines that the cell corresponding to the network device bars access of the terminal device.

In another example, in a case that the terminal device belongs to the first terminal type (for example, the terminal device has the TA pre-compensation capability, or the terminal device has the positioning capability, or the terminal device has the TA pre-compensation capability and the positioning capability), if the first information includes the random access resource configuration information corresponding to the first terminal type, and/or the first information includes the random access resource configuration information corresponding to the second terminal type, then the terminal device determines that the cell corresponding to the network device allows access of the terminal device; or, if the first information excludes the random access resource configuration information corresponding to the first terminal type, and the first information excludes the random access resource configuration information corresponding to the second terminal type, then the terminal device determines that the cell corresponding to the network device bars access of the terminal device.

Optionally, in a case that the terminal device belongs to the first terminal type, if the cell corresponding to the network device allows access of the first terminal type, then the terminal device performs random access using random access resources configured for the first terminal type. Optionally, if the cell corresponding to the network device bars access of the first terminal type and allows access of the second terminal type, then the terminal device performs random access using random access resources configured for the second terminal type.

In another example, in a case that the terminal device belongs to the second terminal type (for example, the terminal device does not have the TA pre-compensation capability, or the terminal device does not have the positioning capability, or the terminal device does not have the TA pre-compensation capability and/or the positioning capability), if the first information includes the random access resource configuration information corresponding to the second terminal type, then the terminal device determines that the cell corresponding to the network device allows access of the terminal device; or, if the first information excludes the random access resource configuration information corresponding to the second terminal type, then the terminal device determines that the cell corresponding to the network device bars access of the terminal device.

Optionally, in a case that the terminal device belongs to the second terminal type, if the cell corresponding to the network device allows access of the second terminal type, then the terminal device performs random access using random access resources configured for the second terminal type.

In the present disclosure, the corresponding random access resource configuration information is configured or not configured for different terminal types respectively, and the random access resource configuration information indicates whether access is allowed or barred, thereby realizing cell access control for different terminal types respectively.

In addition, in some embodiments, when the terminal device belongs to the first terminal type (for example, the terminal device has the TA pre-compensation capability, or the terminal device has the positioning capability, or the terminal device has the TA pre-compensation capability and the positioning capability), the terminal device preferentially determines whether the cell corresponding to the network device allows access of the terminal device based on whether the first information includes the random access resource configuration information corresponding to the first terminal type. Further, in response to determining that the cell corresponding to the network device bars access of the first terminal type, the terminal device further determines whether the cell corresponding to the network device allows access of the terminal device based on whether the first information includes the random access resource configuration information corresponding to the second terminal type. With the two-step judgment, the terminal device is guaranteed to access the network using the TA pre-compensation capability to ensure RACH capacity, and access may be performed without using the TA pre-compensation capability when the network is congested, which increases the chance of access success, thus improving the access success rate.

In an exemplary embodiment, the first information includes UAC configuration information for performing a UAC checking to determine whether access is allowed or barred. Reference is made to the above description for the process of the UAC checking, which will not be repeated here.

Optionally, the UAC configuration information includes at least one of: a UAC-BarringInfoSetIndex corresponding to each access category, a uac-BarringFactor corresponding to each access category, a uac-BarringTime corresponding to each access category, and a uac-BarringForAccessIdentity corresponding to each access category. The introduction and explanation of these parameters may also be referred to above, and will not be repeated here.

Optionally, for the target terminal type in the at least two terminal types (the target terminal type may be any one of the at least two terminal types), responsive to that a UAC checking performed based on UAC configuration information corresponding to the target terminal type passes, it is determined that the cell corresponding to the network device allows access of the target terminal type; or, responsive to that a UAC checking performed based on UAC configuration information corresponding to the target terminal type fails, it is determined that the cell corresponding to the network device bars access of the target terminal type.

Figure 10:
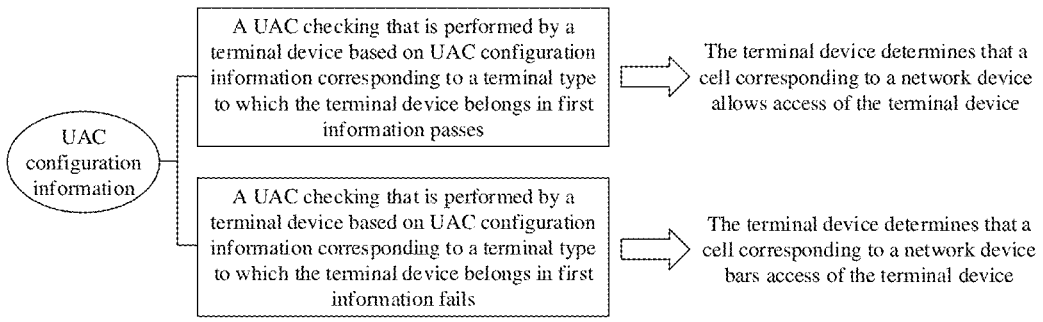
FIG. 10 is a schematic diagram of performing allowing or barring determination based on Unified Access Control (UAC) configuration information according to an embodiment of the present disclosure.

In one example, when the first information includes the UAC configuration information, the terminal device performs the UAC checking based on the UAC configuration information corresponding to a terminal type to which the terminal device belongs, and determines whether the cell corresponding to the network device allows or bars access of the terminal device based on the UAC checking result. For example, as illustrated in FIG. 10, the terminal device performs the UAC checking based on the UAC configuration information corresponding to the terminal type to which the terminal device belongs in the first information; the terminal device determines that the cell corresponding to the network device allows access of the terminal device in response to the UAC checking passing, or the terminal device determines that the cell corresponding to the network device bars access of the terminal device in response to the UAC checking failing. As an example, assuming that the first information includes the UAC configuration information corresponding to the first terminal type and the UAC configuration information corresponding to the second terminal type, if the terminal device belongs to the first terminal type, then the terminal device performs the UAC checking based on the UAC configuration information corresponding to the first terminal type, determines that the cell corresponding to the network device allows access of the terminal device in response to the UAC checking passing, and determines that the cell corresponding to the network device bars access of the terminal device in response to the UAC checking failing; if the terminal device belongs to the second terminal type, then the terminal device performs the UAC checking based on the UAC configuration information corresponding to the second terminal type, and determines that the cell corresponding to the network device allows access of the terminal device in response to the UAC checking passing, and determines that the cell corresponding to the network device bars access of the terminal device in response to the UAC checking failing.

Figure 11:
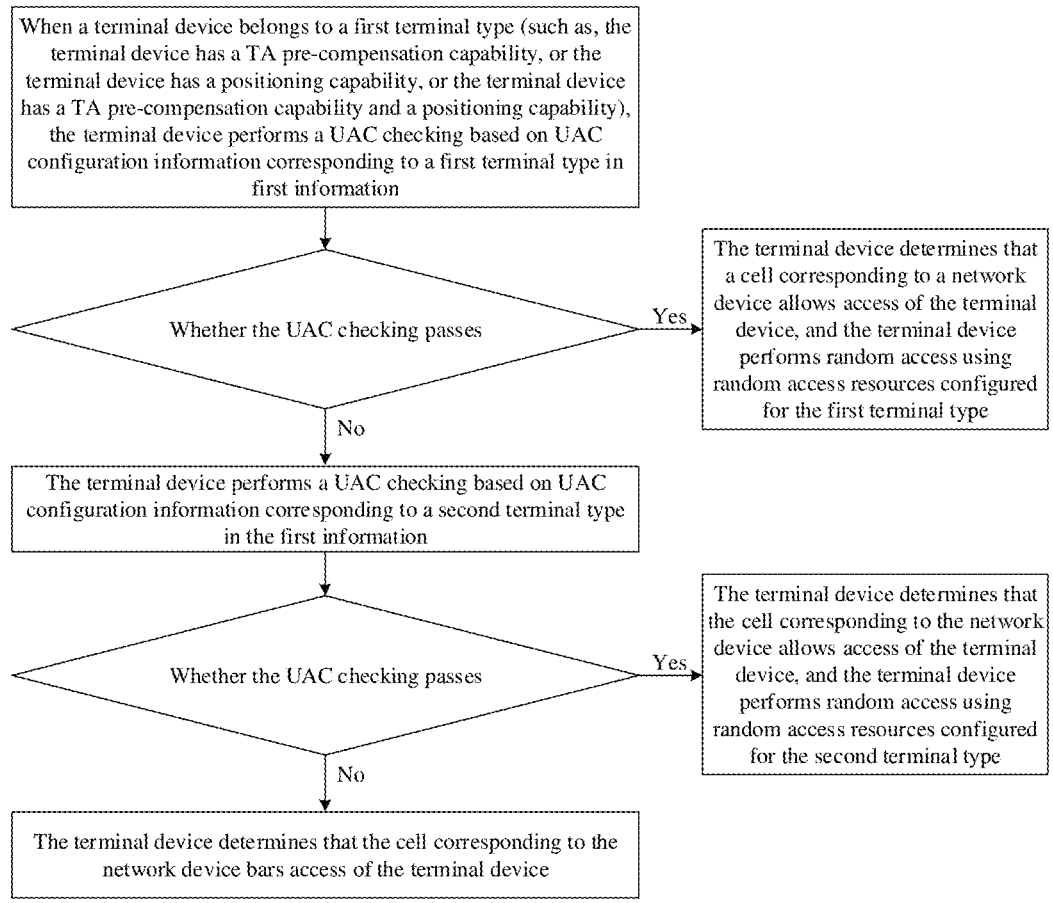
FIG. 11 is a schematic diagram of performing allowing or barring determination based on UAC configuration information according to another embodiment of the present disclosure.

In another example, as illustrated in FIG. 11, in a case that the terminal device belongs to the first terminal type (such as, the terminal device has the TA pre-compensation capability, or the terminal device has the positioning capability, or the terminal device has the TA pre-compensation capability and the positioning capability), if the UAC checking performed based on the UAC configuration information corresponding to the first terminal type in the first information passes, then the terminal device determines that the cell corresponding to the network device allows access of the terminal device; or, if the UAC checking performed based on the UAC configuration information corresponding to the first terminal type in the first information fails, and the UAC checking performed based on the UAC configuration information corresponding to the second terminal type in the first information passes, then the terminal device determines that the cell corresponding to the network device allows access of the terminal device; or, if the UAC checking performed based on the UAC configuration information corresponding to the first terminal type in the first information fails, and the UAC checking performed based on the UAC configuration information corresponding to the second terminal type in the first information fails, then the terminal device determines that the cell corresponding to the network device bars access of the terminal device.

In another example, in a case that the terminal device belongs to the first terminal type (such as, the terminal device has the TA pre-compensation capability, or the terminal device has the positioning capability, or the terminal device has the TA pre-compensation capability and the positioning capability), if the UAC checking performed based on the UAC configuration information corresponding to the first terminal type in the first information passes, and/or the UAC checking performed based on the UAC configuration information corresponding to the second terminal type in the first information passes, then the terminal device determines that the cell corresponding to the network device allows access of the terminal device; or, if the UAC checking performed based on the UAC configuration information corresponding to the first terminal type in the first information fails, and the UAC checking performed based on the UAC configuration information corresponding to the second terminal type in the first information fails, then the terminal device determines that the cell corresponding to the network device bars access of the terminal device.

Optionally, in a case that the terminal device belongs to the first terminal type, if the cell corresponding to the network device allows access of the first terminal type, then the terminal device performs random access using random access resources configured for the first terminal type. Optionally, if the cell corresponding to the network device bars access of the first terminal type and allows access of the second terminal type, then the terminal device performs random access using random access resources configured for the second terminal type.

In another example, when the terminal device belongs to the second terminal type (such as, the terminal device does not have the TA pre-compensation capability, or the terminal device does not have the positioning capability, or the terminal device does not have the TA pre-compensation capability and/or the positioning capability), the terminal device performs the UAC checking based on the UAC configuration information corresponding to the second terminal type in the first information, determines that the cell corresponding to the network device allows access of the terminal device in response to the UAC checking passing, and determines that the cell corresponding to the network device bars access of the terminal device in response to the UAC checking failing.

Optionally, in a case that the terminal device belongs to the second terminal type, if the cell corresponding to the network device allows access of the second terminal type, then the terminal device performs random access using random access resources configured for the second terminal type.

In the present disclosure, respective UAC configuration information is configured for different terminal types, and the UAC checking is performed based on the UAC configuration information to determine whether access is allowed or barred, thereby realizing cell access control for different terminal types respectively.

In addition, in some embodiments, when the terminal device belongs to the first terminal type (for example, the terminal device has the TA pre-compensation capability, or the terminal device has the positioning capability, or the terminal device has the TA pre-compensation capability and the positioning capability), the terminal device preferentially determines whether the cell corresponding to the network device allows access of the terminal device based on the UAC configuration information corresponding to the first terminal type. Further, in response to determining that the cell corresponding to the network device bars access of the first terminal type, the terminal device further determines whether the cell corresponding to the network device allows access of the terminal device based on the UAC configuration information corresponding to the second terminal type. With the two-step judgment, the terminal device is guaranteed to access the network using the TA pre-compensation capability to ensure RACH capacity, and access may be performed without using the TA pre-compensation capability when the network is congested, which increases the chance of access success, thus improving the access success rate.

It should be noted that in the method embodiments, the technical solutions of the present disclosure are introduced and explained only from the perspective of the interaction between the terminal device and the network device. The operations performed by the terminal device may be individually realized as the method for cell access control on the terminal device side, and the operations performed by the network device may be individually realized as the method for cell access control on the network device side.

The following are device embodiments of the present disclosure, which may be used to perform the method embodiments of the present disclosure. For details not disclosed in the device embodiments of the present disclosure, reference is made to the method embodiments of the present disclosure.

Figure 12:
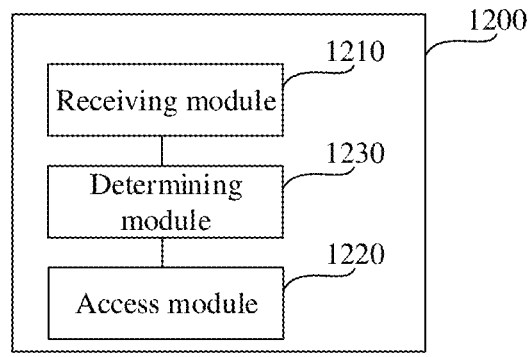
FIG. 12 is a block diagram of a device for cell access control according to an embodiment of the present disclosure.

With reference to FIG. 12, a block diagram of a device for cell access control according to an embodiment of the present disclosure is illustrated. The device has functions of realizing the above method examples, these functions may be realized by hardware or by executing corresponding software by the hardware. The device may be the terminal device described above, or may be disposed in the terminal device. As illustrated in FIG. 12, the device 1200 may include a receiving module 1210 and an access module 1220.

The receiving module 1210 is configured to receive first information from a network device, and the first information determines whether each of at least two terminal types is allowed to access a cell corresponding to the network device or barred from accessing the cell corresponding to the network device.

The access module 1220 is configured to access or not access the cell based on the first information.

In an exemplary embodiment, the first information includes cell access barring indication information for indicating whether access is allowed or barred.

Optionally, as illustrated in FIG. 12, the device 1200 further includes a determining module 1230.

In one example, the determining module 1230 is configured to determine that the cell allows access of the terminal device if the cell access barring indication information corresponding to a terminal type to which the terminal device belongs in the first information indicates that access is allowed; or the determining module 1230 is configured to determine that the cell bars access of the terminal device if the cell access barring indication information corresponding to a terminal type to which the terminal device belongs in the first information indicates that access is barred.

In another example, in a case that the terminal device belongs to a first terminal type, the determining module 1230 is configured to determine that the cell allows access of the terminal device if the cell access barring indication information corresponding to the first terminal type in the first information indicates that access is allowed, and/or the cell access barring indication information corresponding to a second terminal type in the first information indicates that access is allowed; or, the determining module 1230 is configured to determine that the cell bars access of the terminal device if the cell access barring indication information corresponding to the first terminal type in the first information indicates that access is barred, and the cell access barring indication information corresponding to a second terminal type in the first information indicates that access is barred.

In an exemplary embodiment, the first information includes random access resource configuration information for indicating whether access is allowed or barred.

Optionally, as illustrated in FIG. 12, the device 1200 further includes the determining module 1230.

In one example, the determining module 1230 is configured to determine that the cell allows access of the terminal device if the first information includes the random access resource configuration information corresponding to a terminal type to which the terminal device belongs; or, the determining module 1230 is configured to determine that the cell bars access of the terminal device if the first information excludes the random access resource configuration information corresponding to a terminal type to which the terminal device belongs.

In another example, in a case that the terminal device belongs to a first terminal type, the determining module 1230 is configured to determine that the cell allows access of the terminal device if the first information includes the random access resource configuration information corresponding to the first terminal type and/or the random access resource configuration information corresponding to a second terminal type; or the determining module 1230 is configured to determine that the cell bars access of the terminal device if the first information excludes the random access resource configuration information corresponding to the first terminal type and the random access resource configuration information corresponding to a second terminal type.

In exemplary embodiments, the first information includes UAC configuration information for the terminal device to perform a UAC checking to determine whether the access is allowed or barred.

Optionally, as illustrated in FIG. 12, the device 1200 further includes the determining module 1230.

In one example, the determining module 1230 is configured to perform the UAC checking based on UAC configuration information corresponding to a terminal type to which the terminal device belongs in the first information; determine that the cell allows access of the terminal device if the UAC checking passes, or determine that the cell bars access of the terminal device if the UAC checking fails.

In another example, in a case that the terminal device belongs to a first terminal type, the determination module 1230 is configured to determine that the cell allows access of the terminal device if a UAC checking performed based on UAC configuration information corresponding to the first terminal type in the first information passes, and/or a UAC checking performed based on UAC configuration information corresponding to a second terminal type in the first information passes; or the determination module 1230 is configured to determine that the cell bars access of the terminal device if a UAC checking performed based on UAC configuration information corresponding to the first terminal type in the first information fails, and a UAC checking performed based on UAC configuration information corresponding to a second terminal type in the first information fails.

In an exemplary embodiment, the terminal type is determined based on at least one of: a TA pre-compensation capability or a positioning capability.

In exemplary embodiments, the at least two terminal types include the first terminal type and the second terminal type. The first terminal type has a TA pre-compensation capability and the second terminal type does not have a TA pre-compensation capability; or the first terminal type has a positioning capability and the second terminal type does not have a positioning capability; or the first terminal type has a TA pre-compensation capability and a positioning capability, and the second terminal type does not have a TA pre-compensation capability and/or a positioning capability.

In an exemplary embodiment, as illustrated in FIG. 12, the device 1200 further includes the determining module 1230. In response to determining that the cell bars access of the terminal device, the determining module 1230 is further configured to determine, based on intra-frequency reselection indication information corresponding to a terminal type to which the terminal device belongs, whether to allow selection or reselection of an intra-frequency cell of the cell corresponding to the network device for access.

In an exemplary embodiment, the receiving module 1210 is configured to receive system information from the network device, and the system information includes the first information.

Optionally, the first information is entirely included in one MIB; or the first information is entirely included in one SIB; or the first information is dispersed in one MIB and at least one SIB; or the first information is dispersed in multiple SIBs.

Figure 13:
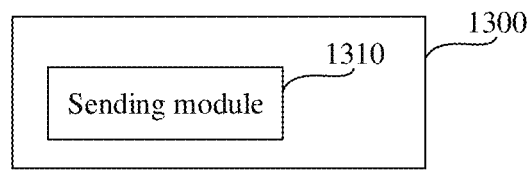
FIG. 13 is a block diagram of a device for cell access control according to another embodiment of the present disclosure.

With reference to FIG. 13, a block diagram of a device for cell access control according to another embodiment of the present disclosure is illustrated. The device has functions of realizing the above method examples, these functions may be realized by hardware or by executing corresponding software by the hardware. The device may be the network device described above, or may be disposed in the network device. As illustrated in FIG. 13, the device 1300 may include a sending module 1310.

The sending module 1310 is configured to send first information, and the first information determines whether each of at least two terminal types is allowed to access a cell corresponding to the network device or barred from accessing the cell corresponding to the network device.

In an exemplary embodiment, the first information includes cell access barring indication information for indicating whether access is allowed or barred.

In one example, if the cell access barring indication information corresponding to a terminal type to which a terminal device belongs in the first information indicates that access is allowed, then the terminal device determines that the cell allows access of the terminal device; or if the cell access barring indication information corresponding to a terminal type to which a terminal device belongs in the first information indicates that access is barred, then the terminal device determines that the cell bars access of the terminal device.

In another example, in a case that the terminal device belongs to a first terminal type, if the cell access barring indication information corresponding to the first terminal type in the first information indicates that access is allowed, and/or, if the cell access barring indication information corresponding to a second terminal type in the first information indicates that access is allowed, then the terminal device determines that the cell allows access of the terminal device; or if the cell access barring indication information corresponding to the first terminal type in the first information indicates that access is barred, and the cell access barring indication information corresponding to a second terminal type in the first information indicates that access is barred, then the terminal device determines that the cell bars access of the terminal device.

In an exemplary embodiment, the first information includes random access resource configuration information for indicating whether access is allowed or barred.

In one example, if the first information includes random access resource configuration information corresponding to a terminal type to which a terminal device belongs, then the terminal device determines that the cell allows access of the terminal device; or if the first information excludes random access resource configuration information corresponding to a terminal type to which a terminal device belongs, then the terminal device determines that the cell bars access of the terminal device.

In another example, in a case that the terminal device belongs to the first terminal type, if the first information includes the random access resource configuration information corresponding to the first terminal type, and/or if the random access resource configuration information corresponding to the second terminal type, then the terminal device determines that the cell allows access of the terminal device; or if the first information does not include the random access resource configuration information corresponding to the first terminal type and the random access resource configuration information corresponding to the second terminal type, then the terminal device determines that the cell bars access of the terminal device.

In an exemplary embodiment, the first information includes UAC configuration information for performing a UAC checking to determine whether access is allowed or barred.

In one example, a terminal device performs the UAC checking based on UAC configuration information corresponding to a terminal type to which the terminal device belongs in the first information; if the UAC checking passes, the terminal device determines that the cell allows access of the terminal device, or if the UAC checking fails, the terminal device determines that the cell bars access of the terminal device.

In another example, in a case that the terminal device belongs to a first terminal type, if a UAC checking performed based on UAC configuration information corresponding to the first terminal type in the first information passes, and/or if a UAC checking performed based on UAC configuration information corresponding to the second terminal type in the first information passes, then the terminal device determines that the cell allows access of the terminal device; or if a UAC checking performed based on UAC configuration information corresponding to the first terminal type in the first information fails, and a UAC checking performed based on UAC configuration information corresponding to the second terminal type in the first information fails, then the terminal device determines that the cell bars access of the terminal device.

In an exemplary embodiment, the terminal type is determined based on at least one of: a timing advance TA pre-compensation capability or a positioning capability.

In an exemplary embodiment, the at least two terminal types include the first terminal type and the second terminal type. The first terminal type has a TA pre-compensation capability and the second terminal type does not have a TA pre-compensation capability; or the first terminal type has a positioning capability and the second terminal type does not have a positioning capability; or the first terminal type has a TA pre-compensation capability and a positioning capability, and the second terminal type does not have a TA pre-compensation capability and/or a positioning capability.

In an exemplary embodiment, in response to the terminal device determining that the cell bars access of the terminal device, the terminal device determines, based on intra-frequency reselection indication information corresponding to a terminal type to which the terminal device belongs, whether to allow selection or reselection of an intra-frequency cell of the cell corresponding to the network device for access.

In an exemplary embodiment, the sending module 1310 is configured to send system information, and the system information includes the first information.

Optionally, the first information is entirely included in one MIB; or the first information is entirely included in one SIB; or the first information is dispersed in one MIB and at least one SIB; or the first information is dispersed in multiple SIBs.

It should be noted that when the device according to the embodiments realizes its functions, only the division of each function module is illustrated as an example. In practical application, the distribution of the above functions may be completed by different function modules according to actual needs, that is, the content structure of the device is divided into different function modules to complete all or part of the functions described above.

With regard to the devices in the above embodiments, the specific manner in which each module performs operations has been described in detail in the method embodiments, which will not be described in detail here.

Figure 14:
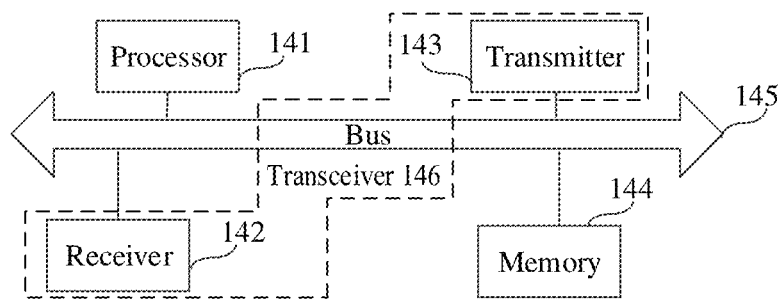
FIG. 14 is a schematic structural diagram of a terminal device according to an embodiment of the present disclosure.

With reference to FIG. 14, a schematic structural diagram of a terminal device 140 according to an embodiment of the present disclosure is illustrated. For example, the terminal device 140 may be used to perform the method for cell access control described above. Specifically, the terminal device 140 may include a processor 141, a receiver 142, a transmitter 143, a memory 144 and a bus 145.

The processor 141 includes one or more processing cores, and the processor 141 performs various functional applications and processes information by executing software programs and modules.

The receiver 142 and the transmitter 143 may be implemented as a transceiver 146, which may be a communication chip.

The memory 144 is connected to the processor 141 by means of the bus 145.

The memory 144 may be used to store a computer program, and the processor 141 is used to execute the computer program to implement the various operations performed by the terminal device in the method embodiments mentioned above.

In addition, the memory 144 may be implemented by any type of volatile or non-volatile storage devices or any combination thereof. The volatile or non-volatile storage devices include, but are not limited to: Random Access Memory (RAM), Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (DVD) or other optical storage, cassette, magnetic tape, magnetic disk storage or other magnetic storage devices.

The transceiver 146 is configured to receive first information from a network device, and the first information determines whether each of at least two terminal types is allowed to access a cell corresponding to the network device or barred from accessing the cell corresponding to the network device.

The processor 141 is configured to access or not access the cell based on the first information.

For details not described in detail in the present embodiment, reference is made to the introductory explanation in the above embodiments, which will not be repeated here.

Figure 15:
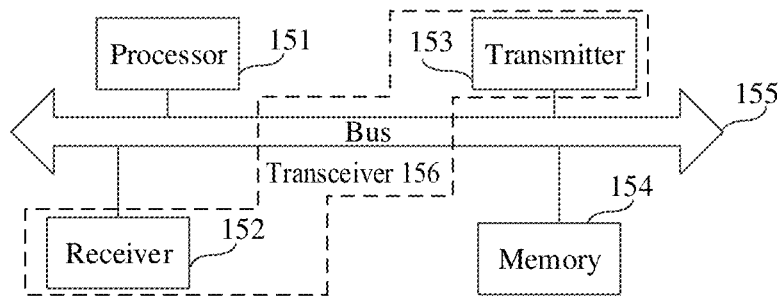
FIG. 15 is a schematic structural diagram of a network device according to an embodiment of the present disclosure.

With reference to FIG. 15, a schematic structural diagram of a network device 150 according to an embodiment of the present disclosure is illustrated. For example, the network device may be used to perform the method for cell access control described above. Specifically, the network device 150 may include a processor 151, a receiver 152, a transmitter 153, a memory 154 and a bus 155.

The processor 151 includes one or more processing cores, and the processor 151 performs various functional applications and processing information by executing software programs and modules.

The receiver 152 and the transmitter 153 may be implemented as a transceiver 156, which may be a communication chip.

The memory 154 is connected to the processor 151 by means of the bus 155.

The memory 154 may be used to store a computer program, and processor 151 is used to execute the computer program to implement the various operations performed by the network device in the method embodiments mentioned above.

In addition, the memory 154 may be implemented by any type of volatile or non-volatile storage devices or any combination thereof. The volatile or non-volatile storage devices include, but are not limited to: RAM and ROM, EPROM, EEPROM, flash memory or other solid-state storage technology, CD-ROM, DVD or other optical storage, cassette, magnetic tape, magnetic disk storage or other magnetic storage devices.

The transceiver 156 is configured to send first information, and the first information determines whether each of at least two terminal types is allowed to access a cell corresponding to the network device or barred from accessing the cell corresponding to the network device.

For details not described in detail in the present embodiment, reference is made to the introductory explanation in the above embodiments, which will not be repeated here.

A computer-readable storage medium having stored a computer program is also provided according to an embodiment of the present disclosure. The computer program is executed by the processor of the terminal device, to implement the method for cell access control at the terminal device side.

A computer-readable storage medium having stored a computer program is also provided according to an embodiment of the present disclosure. The computer program is executed by the processor of the network device, to implement the method for cell access control at the network device side.

Optionally, the computer-readable storage medium may include ROM, RAM, Solid State Drives (SSDs), optical disk or the like. The random access memory may include Resistive Random Access Memory (ReRAM) and Dynamic Random Access Memory (DRAM).

A chip is also provided according to an embodiment of the present disclosure. The chip includes programmable logic circuits and/or program instructions, the chip is configured to, when run on the terminal device, implement the method for cell access control at the terminal device side.

A chip is also provided according to an embodiment of the present disclosure. The chip includes programmable logic circuits and/or program instructions, the chip is configured to, when run on the network device, implement the method for cell access control at the network device side.

A computer program product or computer program is also provided according to an embodiment of the present disclosure. The computer program product or computer program includes computer instructions stored in a computer-readable storage medium. A processor of the terminal device reads and executes the computer instructions from the computer-readable storage medium to implement the method for cell access control at the terminal device side.

A computer program product or computer program is also provided according to an embodiment of the present disclosure. The computer program product or computer program includes computer instructions stored in a computer-readable storage medium. A processor of the network device reads and executes the computer instructions from the computer-readable storage medium to implement the method for cell access control at the network device side.

It is to be understood that "indication" referred in the embodiments of the present disclosure may be a direct indication, may also be an indirect indication and may also be a representation of an association relationship. For example, A indicates B, which may represent that A directly indicates B (for example, B may be obtained by A); which may also represent that A indirectly indicates B (for example, A indicates C, and B may be obtained by C); and which may also represent that there is an association relationship between A and B.

In the description of the embodiments of the present disclosure, the term "correspondence" may represent that there is a direct or indirect correspondence relationship between the two, may also represent that there is an association relationship between the two, may also be a relationship between indicating and being indicated, configuring and being configured, and so on.

The term "multiple" referred in the present disclosure refers to two or more. The term "and/or" describes an association relationship of associated objects and represents that three relationships may exist. For example, A and/or B may represent three conditions: i.e., independent existence of A, existence of both A and B, and independent existence of B. The character "/" usually represents that previous and next associated objects form an "or" relationship.

In addition, the numbering of the operations described in the present disclosure only illustrates a possible sequence of execution between the operations, and in some other embodiments, the above operations may also not be performed out of the sequence of numbering, such as, two operations with different numbering are performed simultaneously, or two operations with different numbering are performed in the reverse sequence to the illustration, which is not limited by the embodiments of the present disclosure.

Those skilled in the art will appreciate that, in one or more of the above examples, the functions described in the embodiments of the present disclosure may be implemented in hardware, software, firmware or any combination thereof. When implemented in software, these functions may be stored in a computer-readable medium or transmitted as one or more instructions or codes on the computer-readable medium. The computer-readable medium includes a computer storage medium and a communication medium, where the communication medium includes any medium that facilitates the transmission of a computer program from one place to another. The storage medium may be any available medium accessible to a general purpose or dedicated computer.

The foregoing are only exemplary embodiments of the present disclosure and are not intended to limit the present disclosure. Any modification, equivalent replacement, improvement, etc. made within the spirit and principles of the present disclosure shall be included within the scope of protection of the present disclosure.

The invention claimed is:

1. A method for cell access control, performed by a terminal device and comprising:
   receiving, from a network device, first information for determining whether each of at least two terminal types is allowed to access a cell corresponding to the network device or barred from accessing the cell corresponding to the network device, wherein each of the at least two terminal types is determined based on a timing advance (TA) pre-compensation capability; and
   accessing or not accessing the cell based on the first information,
   wherein the first information comprises cell access barring indication information for directly indicating whether access is allowed or barred.

2. The method of claim 1, further comprising: after receiving, from the network device, the first information,
   determining, responsive to that the cell access barring indication information corresponding to a terminal type to which the terminal device belongs in the first information indicates that access is allowed, that the cell allows access of the terminal device; or
   determining, responsive to that the cell access barring indication information corresponding to a terminal type to which the terminal device belongs in the first information indicates that access is barred, that the cell bars access of the terminal device.

3. The method of claim 1, wherein the terminal device belongs to a first terminal type, and the method further comprises: after receiving, from the network device, the first information,
   determining, responsive to at least one of: the cell access barring indication information corresponding to the first terminal type in the first information indicates that access is allowed or the cell access barring indication information corresponding to a second terminal type in the first information indicates that access is allowed, that the cell allows access of the terminal device; or
   determining, responsive to that the cell access barring indication information corresponding to the first terminal type in the first information indicates that access is barred, and the cell access barring indication information corresponding to a second terminal type in the first information indicates that access is barred, that the cell bars access of the terminal device.

4. The method of claim 3, wherein the at least two terminal types comprise the first terminal type and the second terminal type, wherein
   the first terminal type has the TA pre-compensation capability and the second terminal type has no TA pre-compensation capability; or
   the first terminal type has a positioning capability and the second terminal type has no positioning capability; or
   the first terminal type has the TA pre-compensation capability and a positioning capability, and the second terminal type has no at least one of the TA pre-compensation capability or the positioning capability.

5. The method of claim 1, wherein each of the at least two terminal types is further determined based on a positioning capability.

6. The method of claim 1, wherein the cell access barring indication information is a cellBarred parameter, and the cellBarred parameter takes a value of Barred or notBarred.

7. A method for cell access control, performed by a network device and comprising:
   sending first information for determining whether each of at least two terminal types is allowed to access a cell corresponding to the network device or barred from accessing the cell corresponding to the network device, wherein each of the at least two terminal types is determined based on a timing advance (TA) pre-compensation capability, and
   wherein the first information comprises cell access barring indication information for directly indicating whether access is allowed or barred.

8. The method of claim 7, wherein sending the first information comprises:
   sending system information comprising the first information.

9. The method of claim 8, wherein
   the first information is entirely included in one Master Information Block (MIB); or
   the first information is entirely included in one system information block (SIB); or
   the first information is dispersed in one MIB and at least one SIB; or
   the first information is dispersed in a plurality of SIBs.

10. A terminal device, comprising:
    a transceiver, configured to receive, from a network device, first information for determining whether each of at least two terminal types is allowed to access a cell corresponding to the network device or barred from accessing the cell corresponding to the network device, wherein each of the at least two terminal types is determined based on a timing advance (TA) pre-compensation capability; and
    a processor, configured to access or not access the cell based on the first information,
    wherein the first information comprises cell access barring indication information for directly indicating whether access is allowed or barred.

11. The terminal device of claim 10, wherein the at least two terminal types comprise a first terminal type and a second terminal type, wherein
    the first terminal type has the TA pre-compensation capability and the second terminal type has no TA pre-compensation capability; or
    the first terminal type has a positioning capability and the second terminal type has no positioning capability; or
    the first terminal type has the TA pre-compensation capability and a positioning capability, and the second terminal type has no at least one of the TA pre-compensation capability or the positioning capability.

12. The terminal device of claim 10, wherein the transceiver is further configured to receive, from the network device, system information comprising the first information.

13. The terminal device of claim 12, wherein
the first information is entirely included in one Master Information Block (MIB); or
the first information is entirely included in one system information block (SIB); or
the first information is dispersed in one MIB and at least one SIB; or
the first information is dispersed in a plurality of SIBs.

14. A network device, comprising:
a transceiver, configured to send first information for determining whether each of at least two terminal types is allowed to access a cell corresponding to the network device or barred from accessing the cell corresponding to the network device, wherein each of the at least two terminal types is determined based on a timing advance (TA) pre-compensation capability, and
wherein the first information comprises cell access barring indication information for directly indicating whether access is allowed or barred.

15. The network device of claim 14, wherein
responsive to that the cell access barring indication information corresponding to a terminal type to which a terminal device belongs in the first information indicates that access is allowed, the first information indicates that the cell allows access of the terminal device; or
responsive to that the cell access barring indication information corresponding to a terminal type to which a terminal device belongs in the first information indicates that access is barred, the first information indicates that the cell bars access of the terminal device.

16. The network device of claim 14, wherein each of the at least two terminal types further determined based on a positioning capability.

17. The network device of claim 14, wherein the at least two terminal types comprise a first terminal type and a second terminal type, wherein
the first terminal type has the TA pre-compensation capability and the second terminal type has no TA pre-compensation capability; or
the first terminal type has a positioning capability and the second terminal type has no positioning capability; or
the first terminal type has the TA pre-compensation capability and a positioning capability, and the second terminal type has no at least one of the TA pre-compensation capability or the positioning capability.

18. The network device of claim 14, wherein the transceiver is further configured to send system information comprising the first information.

* * * * *